United States Patent Office 3,281,392
Patented Oct. 25, 1966

3,281,392
POLYOXYMETHYLENE COMPOSITIONS STABILIZED WITH PYRIMIDINE DERIVATIVES
Nino Oddo, Milan, and Angelo Porrà, Montefiore dell' Aso, Ascoli Piceno, Italy, assignors to Montecatini Societa Generale per l'Industria Mineraria e Chimica, Milan, Italy
No Drawing. Filed June 7, 1963, Ser. No. 286,185
Claims priority, application Italy, June 8, 1962, 11,593/62
12 Claims. (Cl. 260—45.8)

This invention is directed to a thermally stable composition and more specifically to a thermally stabilized poyoxymethylene composition. Still more specifically, this invention is directed to the stabilization of polyoxymethylenes against high temperatures with pyrimidine derivatives.

It is well known that polyoxymethylenes are characterized by a high thermal degradability and that at their melting point or at a higher temperature, they will depolymerize. The depolymerization of the polyoxymethylene chain may take place by at least three different mechanisms:

(1) by depolymerization of the terminal OH group of the chain, which results in the elimination of $CH_2O$.

(2) by attack of the methylenic groups of the polymer with oxygen with the formation of peroxidic groups followed by the breaking of the acetalic bonds of the chain.

(3) by acidolytic attack of the C-O-C bonds of the chain with hydrogen ions. This attack may be caused by $CH_2O$ which is liberated during the depolymerization mechanisms (1) and (2) or by oxidation due to the presence of air to form HCOOH.

In order to improve the thermal stability of polyoxymethylenes so that their use can become more practical, it has become necessary to stabilize the terminal OH group of the chain. This may be accomplished by blocking the hydroxyl group by means of a reaction with a more highly stable chemical group. Various techniques have been used for this purpose, some of which include esterification, etherification, etc. The polymers obtained by these techniques, however, were not sufficiently stable at higher temperatures. In fact, the application of heat caused the polymeric chains to split into small sections with the contemporaneous formation of monomeric $CH_2O$ which resulted in a substantial reduction of molecular weight. To prevent this from happening, various organic compounds have been used to further stabilize the polyoxymethylenes having esterified or etherified terminal groups.

Presently, at least two types of organic compounds are being used as stabilizers, each being a specific inhibitor for one of the possible degradation processes such as peroxidation or splitting of the chain through a different chemical mechanism. These stabilizing agents or inhibitors include such organic compounds as the aromatic amines, phenols, and other known antioxidants. These antioxidants may also be used with other stabilizers capable of blocking the depolymerization mechanisms and include such known compounds as the polyamides, polyurethanes, urea, etc.

Notwithstanding the above-mentioned techniques and organic compounds used to stabilize the polyoxymethylenes, it has been discovered, quite unexpectedly, that the stability of these polymers at high temperatures can be improved substantially by intimately mixing with the polyoxymethylenes a stabilizer comprising a pyrimidine derivative. The pyrimidine derivatives to be used for purposes of this invention are selected from the group consisting of derivatives of barbituric acid and uric acid. More specifically, these derivatives can be represented by the general Formulae I and II, respectively.

I. 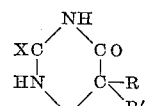

II. 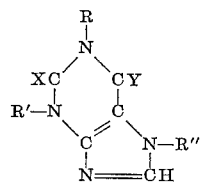

Of the compounds represented by the general Formula I, the preferred compounds include those wherein R and R' is either a hydrogen atom or an alkyl, isoalkyl or aryl group and X is either an oxygen or sulfur atom.

Typical examples which come within the Formula I include 5-phenyl-5-ethyl barbituric acid, 5,5-diethyl barbituric acid, 5-ethyl-5-(1-methylbutyl) barbituric acid, 5-ethyl-5-(1-methyl-butyl)2-thiobarbituric acid, 5-allyl-5-diphenyl barbituric acid, 5,5-diphenyl barbituric acid, 5-ethyl-5-isoamyl barbituric acid, 5-allyl-5-(1-methylbutyl) barbituric acid, 5-vinyl-5-n-butyl barbituric acid, 5-ethyl-5-cyclohexyl barbituric acid, 5-phenyl barbituric acid, 5-ethyl-2-thiobarbituric acid, and 5,5-diethyl-2-thiobarbituric acid.

Typical derivatives which are represented by the general formula II include compounds wherein R, R' and R" are either a hydrogen atom or an akyl, isoalkyl or aryl group, and X and Y are either an oxygen or sulfur atom. Examples of these compounds include the methylxanthines such as theobromine, theophylline, caffeine, etc.

It has also been discovered that the thermal stability of the polyoxymethylenes can be materially improved by the addition of a small but an effective amount of a well-known antioxidant in combination with one or more of the above-identified pyrimidine derivatives. In other words, a synergistic result can be obtained by using a common antioxidant in combination with the pyrimidine derivative. This was recognized by the fact that the thermal stability of the polyoxymethylene polymers was substantially higher when a combination of the antioxidant and pyrimidine derivative was used in comparison to the use of either one of these compounds alone. While it was found that a combination of the two components gave a synergistic result, it is also known that the antioxidants do not by themselves protect the polyoxymethylene against depolymerization or a lowering of molecular weight at high temperatures. In general, the antioxidants do not prevent the breaking of the acetalic bridges along the polymeric chain which causes a decrease in the inherent viscosity of the product. As distinguished from the use of the antioxidants alone, the polyoxymethylene compositions of this invention are substantially unaltered in their inherent viscosity even after prolonged heat treatments, in the presence of air, at substantially higher temperatures. It was also noticed that the polymers were protected against color change and were maintained perfectly white after long periods of heating in the presence of oxygen.

The pyrimidine derivatives may be incorporated into the polymer by any of the known techniques suitable for obtaining a uniform dispersion of a powdered solid in a polymer. The addition may be carried out at room temperature in a powder mixture or at a temperature higher than the melting point of the polymer in a roll mixer or in a screw extruder.

Still another technique for preparing the mixture consists of dissolving the pyrimidine derivative in a suitable solvent and subsequently impregnating the polymer with the solution and then drying the mixture.

The percentage or concentration of the stabilizing agent of this invention in comparison to other known stabilizers is relatively low. Thus, for example, the pyrimidine can be added in amounts ranging up to about 15% by weight of the polymer and can be used in amounts as low as 0.001% by weight. Preferably, however, the stabilizing agent may range from about 0.01 to 10% by weight of the polymer. In addition to the pyrimidine derivaties, other known additives such as plasticizers, pigments, etc., may be used in combination with the polymer.

The thermal degradability or stability of the polyoxymethylene polymers stabilized in accordance with the teachings of this invention was determined by placing approximately 0.1 gram of the polymer in an oven at a temperature of about 200° C. and in the presence of air. The thermal degradability is expressed as $K_{200}$=the percent weight loss of the polymer after 30 minutes of heat treatment at 200° C. The viscosity data was obtained from solutions of the treated polymer in dimethyl formamide at a concentration of about 0.5 gram of polymer per 100 cc. of solvent, at a temperature of about 150° C. and in the presence of 1 gram per 100 cc. of the solvent of diphenyl amine. The results of the test were determined by the inherent viscosity defined as follows:

$$\text{Inherent viscosity} = \frac{\ln \text{ relative viscosity}}{C}$$

wherein the relative viscosity is the ratio of the viscosity of the solution to the viscosity of the solvent and C is the solute concentration in grams per 100 cc.

The polyoxymethylene polymers used in the test are characterized by long sequences of —($CH_2O$)— units which have an inherent viscosity of at least 0.3. The polymer can be obtained by known methods from aqueous $CH_2O$ solutions or with anhydrous $CH_2O$ or with trioxane. The polymers stabilized in accordance with this invention are particularly suited to be used for the preparation of films, fibers, molded articles and similar materials which can be obtained by extrusion, injection molding, or other known methods.

The following examples and tables illustrate the effectiveness of the pyrimidine derivatives as stabilizing agents for polyoxymethylenes.

*Example 1*

A polyoxymethylene dihydroxide was prepared by the polymerization of anhydrous $CH_2O$ in an anhydrous hydrocarbon solvent such as toluene and in the presence of an anionic catalyst such as tributyl amine at room temperature. The product was acetylated in the presence of acetic anhydride and a hydrocarbon solvent. Samples of the polyoxymethylene diacetate were mixed with the stabilizing agents listed in Table I. The composition was prepared by mixing the polymer and the stabilizing agent in a mill for about 30 minutes. The inherent viscosity of the polymer before and after the mill treatment was approximately 0.68.

The mixture was then subjected in accordance with the above-description to a thermal treatment at a temperature of about 200° C.

The results obtained by the heat treatment are recited in Table I.

TABLE I

| Examples | $K'_{200}$, percent wt. loss | Inherent viscosity |
|---|---|---|
| 1. Untreated Polymer | 42 | 0.24 |
| 2. Polymer plus 2.0% DFA [1] | 9 | 0.37 |
| 3. Polymer plus 2.0% BB [2] | 10 | 0.30 |
| 4. Polymer plus 1% diethylbarbituric acid plus 0.5 BB | 2.5 | 0.54 |
| 5. Polymer plus 2% 5-ethyl-5-(1-methylbutyl) barbituric acid plus 1% DFA | 1 | 0.66 |
| 6. Polymer plus 3% 5-ethyl-5-(1-methylbutyl)-barbituric acid | 2.3 | 0.67 |

[1] DFA=diphenylamine.
[2] BB=4,4'-butylidene-bis-(6-tert. butyl-3-methyl-phenol).
[3] Polyoxymethylene diacetate inherent viscosity=0.68.

It should be noted from Example 6, in the above-table, that the polyoxymethylene was stabilized by the addition of 3% by weight of 5-ethyl-5-(1-ethyl butyl) barbituric acid without the addition of an antioxidant. Moreover, example 5 illustrates the effectiveness of a combination of the barbituric acid and diphenyl amine as a synergistic stabilizing agent for the polymer.

*Example 2*

A polyoxymethylene dihydroxide was prepared and acetylated in the presence of acetic anhydride by the method described in Example 1. The polyoxymethylene diacetate product was treated with the stabilizing agents by mixing the polymer and the stabilizers, with agitation, and then subjecting the treated product to a thermal treatment at 200° C. The inherent viscosity of the polymer was approximately 0.70.

The effectiveness of the stabilizing agents is illustrated in the following table.

TABLE II

| | $K'_{200}$, percent wt. loss | Inherent viscosity after 30' at 200° C. |
|---|---|---|
| Untreated sample of Example 2 | 40 | 0.25 |
| Sample plus 1% phenylethylbarbituric acid plus 1.0% DFA | 6.0 | 0.67 |
| Sample plus 3% phenylethylbarbituric acid plus 1.0% BB | 4.0 | 0.62 |

*Example 3*

A sample of polyoxymethylene dihydroxide was obtained by polymerizing $CH_2O$ in an aqueous medium in the presence of some preformed polymer as the solid phase. The method of synthesizing the product is further described in U.S. patent application Serial No. 168,220 filed on January 23, 1962. The method consists essentially of contacting an aqueous solution at a temperature of 20° C. and at a pH of 10 containing 10% by weight of $CH_2O$ and 40% of sodium formate with the polyoxymethylene at a solid to liquid ratio of approximately 1 to 2. A 51% aqueous solution of the $CH_2O$ and sodium formate was continuously fed to the reaction so as to keep the concentration of the $CH_2O$ and the formate constant in the liquid phase. Likewise, a concentrated solution of sodium hydroxide was continuously fed into the reaction so as to keep the pH of the liquid phase constant. The amount of solid and liquid being continuously discharged from the reactor was kept equal to the amount of reactants being added to the reactor.

The polyoxymethylene product was dried and acetylated in the same manner as described in Example 1. The polyoxymethylene diacetate thus obtained was then treated with a solution of 5-ethyl-5(1-methylbutyl) barbituric acid in ethanol. The amount of barbituric acid in the alcohol was approximately 3% by weight of the polymer. The alcohol was then evaporated by keeping the same at a temperature of about 65° C. under a vacuum for about 4 hours. The treated polymer had an inherent viscosity of about 0.6. The polymer was subsequently thermally treated at a temperature of 200° C. with the results reported in Table III.

TABLE III

|  | $K'_{200}$, percent wt. loss | Inherent Viscosity after 30 min. at 200° C. |
|---|---|---|
| Untreated polymer of Example 3 | 44 | 0.20 |
| Polymer plus 3% 5-ethyl-5(1-methylbutyl) barbituric acid | 2.5 | 0.56 |

*Example 4*

A polyoxymethylene diacetate was prepared in the same manner as described in Example 3 and was mixed with 0.5% by weight of theophylline and 2% by weight of DFA. The mixing of the polymer and the stabilizing agents was carried out in a powder mixer. The inherent viscosity of the polymer before and after the treatment in the mixer was approximately 0.65.

The treated polymer was then subjected to a thermal treatment at a temperature of 200° C. The results of the heat treatment are as follows:

TABLE IV

|  | $K'_{200}$, percent wt. loss | Inherent Viscosity after 30 min. at 200° C. |
|---|---|---|
| Untreated polymer of Example 4 | 39 | 0.21 |
| Polymer plus 0.5% theophylline plus 2% DFA | 3.8 | 0.65 |

While the invention has been described with respect to a number of specific examples, it should be understood that these examples are illustrative only and that various modifications may be made without departing from the spirit and intended scope of the invention except as particularly pointed out in the appended claims.

What is claimed is:

1. A thermally stable polymeric composition consisting essentially of a high molecular weight polyoxymethylene containing recurring —$CH_2O$— units and approximately 0.01 to 10% by weight of the polyoxymethylene of a pyrimidine derivative selected from the group consisting of compounds having the general formula:

I. 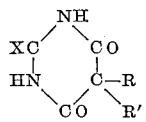

wherein R and R' are selected from the group consisting of a hydrogen atom, alkyl radicals, isoalkyl radicals, and aryl radicals, and X is either an oxygen atom or a sulfur atom and the general formula:

II. 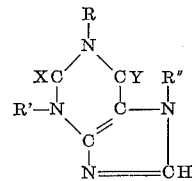

wherein R, R' and R'' are selected from the group consisting of a hydrogen atom, alkyl radicals, isoalkyl radicals and aryl radicals and X and Y are either an oxygen atom or a sulfur atom.

2. The polymeric composition of claim 1 wherein the high molecular weight polyoxymethylene has an inherent viscosity being in excess of 0.3; said inherent viscosity determined from a solution of dimethylformamide containing 0.5% by weight of the polymer at a temperature of 150° C.

3. The polymeric composition of claim 2 wherein the polyoxymethylene has the chain ends blocked by an acyl group.

4. The polymeric composition of claim 2 wherein the polyoxymethylene has the chain ends blocked by an ether group.

5. The polymeric composition of claim 2 wherein the composition contains 0.01 to 5.0% by weight of an antioxidant selected from the group consisting of diphenylamine and 4,4' - butylidene - bis - (6-tert. butyl-3-methylphenol).

6. The polymeric composition of claim 2 wherein the pyrimidine derivative is 5,5-diethyl barbituric acid.

7. The polymeric composition of claim 2 wherein the pyrimidine derivative is 5,5-phenylethylbarbituric acid.

8. The polymeric composition of claim 2 wherein the pyrimidine derivative is 5-ethyl-5(1-methylbutyl) barbituric acid.

9. The polymeric composition of claim 2 wherein the pyrimidine derivative is a methylxanthine.

10. The polymeric composition of claim 9 wherein the methylxanthine is theophylline.

11. The composition of claim 9 wherein the methylxanthine is theobromine.

12. The polymeric composition of claim 9 wherein the methylxanthine is caffeine.

No references cited.

LEON J. BERCOVITZ, *Primary Examiner.*

M. J. WELSH, *Assistant Examiner.*